(12) United States Patent
Ke (10) Patent No.: US 10,592,412 B2
(45) Date of Patent: Mar. 17, 2020

(54) DATA STORAGE DEVICE AND OPERATING METHOD FOR DYNAMICALLY EXECUTING GARBAGE-COLLECTION PROCESS

(71) Applicant: Silicon Motion, Inc., Uhubei, Hsinchu County (TW)

(72) Inventor: Kuan-Yu Ke, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 16/101,742

(22) Filed: Aug. 13, 2018

(65) Prior Publication Data

US 2019/0188129 A1 Jun. 20, 2019

(30) Foreign Application Priority Data

Dec. 20, 2017 (TW) .............................. 106144825 A (51) Int. Cl.
*G06F 3/06* (2006.01)
*G06F 12/02* (2006.01)
(52) U.S. Cl.
CPC .......... *G06F 12/0253* (2013.01); *G06F 3/064* (2013.01); *G06F 3/0608* (2013.01); *G06F 3/0652* (2013.01); *G06F 3/0679* (2013.01); *G06F 2212/7205* (2013.01)
(58) Field of Classification Search
CPC ...... G06F 3/0608; G06F 3/064; G06F 3/0652; G06F 3/0679; G06F 3/0688; G06F 12/0253; G06F 12/0269; G06F 2212/7205

USPC .......................... 707/813, 818, 820; 711/103
See application file for complete search history.

(56) References Cited

U.S. PATENT DOCUMENTS

| 2008/0086619 | A1 | 4/2008 | Traister et al. |
| 2016/0011815 | A1* | 1/2016 | Klein ................... G06F 3/0644 714/6.12 |
| 2016/0132253 | A1* | 5/2016 | Chiu ..................... G06F 3/0608 711/103 |
| 2017/0024132 | A1* | 1/2017 | Jun ........................ G06F 3/0688 |
| 2017/0075805 | A1* | 3/2017 | Ouyang .............. G06F 12/0246 |

FOREIGN PATENT DOCUMENTS

| TW | 201351420 A | 12/2013 |
| TW | 201606778 A | 2/2016 |
| TW | 201729195 A | 8/2017 |

* cited by examiner

*Primary Examiner* — Gary J Portka
(74) *Attorney, Agent, or Firm* — McClure, Qualey & Rodack, LLP (57) ABSTRACT

A data storage device for dynamically executing the garbage-collection process is provided which includes a flash memory and a controller. The flash memory includes a plurality of blocks wherein each of the blocks includes a plurality of pages. The controller is coupled to the flash memory and is utilized to execute the garbage-collection process on the flash memory according to a number of at least one spare block in the flash memory and the number of non-spare blocks corresponding to different ratios of effective pages. The garbage-collection process is utilized for merging at least two non-spare blocks to release at least one spare block.

18 Claims, 6 Drawing Sheets

DATA STORAGE DEVICE AND OPERATING METHOD FOR DYNAMICALLY EXECUTING GARBAGE-COLLECTION PROCESS

CROSS REFERENCE TO RELATED APPLICATIONS

This Application claims priority of Taiwan Patent Application No. 106144825 filed on Dec. 20, 2017, the entirety of which is incorporated by reference herein.

BACKGROUND OF THE INVENTION

Field of the Invention

The present invention relates to a data storage device including a flash memory, and in particular it relates to executing a garbage-collection process on the flash memory.

Description of the Related Art

Garbage-collection (GC) processes are used widely on various kinds of memory devices. Specifically, a garbage-collection process is utilized to merge inefficient blocks, where most of the pages are spare or empty, into one efficient block, thereby obtaining more spare blocks. Therefore, by regularly executing the garbage-collection process, the efficiency of the memory device can be improved.

However, whether the garbage-collection process is executed or not is usually determined by a single threshold value. When it is determined that the garbage-collection process is to be executed, the performance of the memory device suffers. For example, write latency suddenly increases and performance abruptly decays due to the execution of the garbage-collection process. In addition, the memory device has a different operational status and can be accessed with various commands from the host. Therefore, a dynamically adjusted garbage-collection process is needed to prevent an abrupt decay of the memory device's performance, and also to accord with various kinds of operational statuses and host commands.

BRIEF SUMMARY OF THE INVENTION

In order to solve the aforementioned problem, the invention proposes that the garbage-collection process of the present invention can be executed or operated according to a dynamically-adjustable predetermined value rather than a fixed predetermined value to avoid sudden latency of the flash memory. Specifically, at least one threshold value is provided by the present invention to determine the number of non-spare blocks corresponding to different ratios of effective pages for the flash memory in order to dynamically adjust the garbage-collection process. By utilizing the operating method of dynamically adjusting the predetermined value of executing the garbage-collection for the memory, the efficiency of garbage-collection can be improved without affecting the performance of the data storage device.

In one aspect of the invention, the present invention provides a data storage device for dynamically executing the garbage-collection process is provided which includes a flash memory and a controller. The flash memory includes a plurality of blocks wherein each of the blocks includes a plurality of pages. The controller is coupled to the flash memory and is utilized to execute the garbage-collection process on the flash memory according to a number of at least one spare block in the flash memory and the number of non-spare blocks corresponding to different ratios of effective pages. The garbage-collection process is utilized for merging at least two non-spare blocks to obtain at least one spare block.

The controller calculates number of the at least one spare block in the flash memory and determines whether the number of the at least one spare block is lower than a predetermined value or not. When the number of the at least one spare block is lower than the predetermined value, the controller calculates whether or not the number of non-spare blocks corresponding to the first section of the ratio of effective pages is greater than a first threshold value. When the number of non-spare blocks corresponding to the first section of the ratio of effective pages is greater than the first threshold value, the controller decrements the predetermined value by the first difference value. When the number of non-spare blocks corresponding to the first section of the ratio of effective pages is lower than or equal to the first threshold value, the controller calculates whether or not the number of non-spare blocks corresponding to the second section of the ratio of effective pages is greater than the second threshold value.

In addition, when the number of non-spare blocks corresponding to the second section of the ratio of effective pages is greater than the second threshold value, the controller decrements the predetermined value by a second difference value. When the number of non-spare blocks corresponding to the second section of the ratio of effective pages is lower than or equal to the second threshold value, the controller increments the predetermined value by the third difference value. Furthermore, the controller is coupled to a host, and the controller executes the garbage-collection process based on a command which is transmitted by the host.

In another aspect of the invention, the present invention provides a data storage method for dynamically executing a garbage-collection process. The data storage device includes a flash memory and a controller, and the flash memory includes a plurality of blocks. Each of the blocks comprises a plurality of pages. The data storage method includes calculating number of at least one spare block in the flash memory; calculating the number of non-spare blocks corresponding to different ratios of effective pages; and executing the garbage-collection process on the flash memory according to number of at least one spare block in the flash memory and the number of non-spare blocks corresponding to different ratios of effective pages for merging at least two non-spare blocks to obtain at least one spare block.

A detailed description is given in the following embodiments with reference to the accompanying drawings.

BRIEF DESCRIPTION OF DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1:
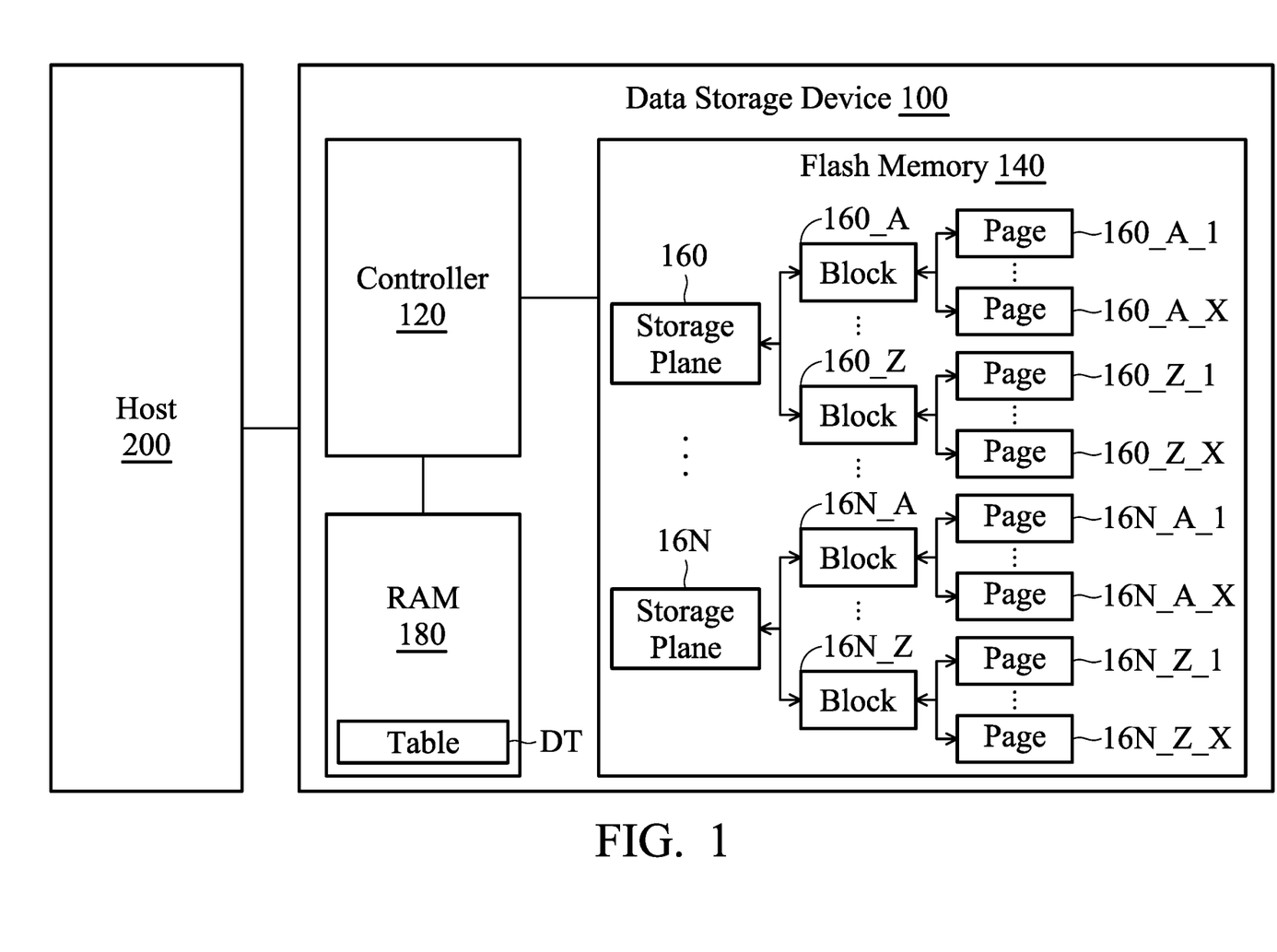
FIG. 1 is a schematic diagram of a data storage device according to an embodiment of the invention.

FIG. 1 is a schematic diagram of a data storage device 100 and a host 200 according to an embodiment of the invention. In one embodiment, the data storage device 100 includes a controller 120, a flash memory 140 and a random access memory (RAM) 180. The data storage device 100 is coupled to the host 200 to transmit data and commands or to receive data and commands. The flash memory 140 can be non-volatile memory such as NAND flash. The data storage device 100 may include (but is not limited to): a portable storage device (such as a memory card complying with the standards of SD/MMC, CF, MS, XD or UFS), a solid state drive (SSD) and various kinds of embedded storage devices (such as embedded storage devices complying with the UFS or EMMC standards). The host 200 can be any one of various kinds of electronic devices, such as a cell phone, a tablet computer, a laptop computer, a navigating apparatus, a car system, or a processor inside one of the electronic devices listed above.

As shown in FIG. 1, the controller 120 is coupled to the flash memory 140 and the RAM 180. The RAM 180 is utilized to temporarily store and cache data that is needed by the controller 120, or to temporarily store data that will be written to the flash memory 140 by the host 200 in order to facilitate timely access to the data storage device 100. The controller 120 performs a read operation on the flash memory 140 by controlling the flash memory 140 with the unit of a cluster. In addition, the controller 120 is coupled to the flash memory 140 to transmit data and instructions or to receive data and instructions mutually. Furthermore, the controller 120 can be a read-only-memory (ROM) and a micro-controller with firmware code, and the micro-controller executes the firmware code to operate or access the flash memory 140.

The flash memory 140 includes a plurality of planes 160~16N. In one embodiment, a portion of each storage plane 160~16N constitutes a super block, and the flash memory 140 includes a plurality of super blocks. Specifically, each of the super blocks 160~16N includes a plurality of blocks. In another embodiment, the plane is the super block. For example, the flash memory 140 has four super blocks (CE0~CE3). The storage plane 160 includes the blocks 160_A~160_Z, and the storage plane 16N includes the blocks 16N_A~16N_Z. Regarding the storage plane 160, each of the blocks 160_A~160_Z further includes a plurality of pages. The block 160_A includes the pages 160_A_1~160_, and the block 160_Z includes the pages 160_Z_1~160_Z_X. The size of each page is N bytes, wherein N is a positive integer greater than one.

For example, each of the storage planes 160~164 includes 820 blocks, and each of the blocks includes 256 pages. The size of each page is 16 KBytes. In addition, the pages 160_A_1~16N_Z_X are physical pages. When the controller 120 performs a write operation or a programming operation on the flash memory 140, it controls the flash memory 140 to perform the write or programming operation with the unit of a physical page.

Regarding the flash memory 140, each of the pages 160_A_1~16N_Z_X has a different physical address. In other words, each of the pages 160_A_1~16N_Z_X has a physical address, and each physical address of the pages 160_A_1-16N_Z_X is different. When a write operation is executed by the data storage device 100, the controller 120 determines the physical address of the flash memory 140 for writing or storing the data. In addition, the physical addresses are mapped to a plurality of respective logical addresses by the controller 120. Therefore, regarding the host 200, the host 200 reads or writes data which is stored in a logical address by the data storage device 100 through the logical address.

In one embodiment, the controller 120 is utilized to execute the garbage-collection process on the flash memory 140 according to the number of spare blocks in the flash memory 140 and the number of non-spare blocks corresponding to different ratios of effective pages. The garbage-collection process is utilized for merging at least two non-spare blocks to obtain at least one spare block. More specifically, the blocks 160_A~16N_Z can be divided into spare blocks and non-spare blocks based on whether the data is stored or not. The spare block is featured by that each page is empty without writing data. In addition, the non-spare block is featured that the data is written into at least one page.

The garbage-collection process of the present invention can be executed or operated according to a dynamically-adjustable predetermined value rather than a fixed predetermined value to avoid the sudden latency of the flash memory 140. Specifically, at least one threshold value is provided by the present invention to determine the number of non-spare blocks corresponding to different ratios of effective pages for the flash memory in order to dynamically adjust the garbage-collection process. By utilizing the operating method of dynamically adjusting the predetermined value of executing the garbage-collection for the memory, the efficiency of garbage-collection can be improved without affecting the performance of the data storage device 100.

In one embodiment, the controller 120 is utilized to calculate the number of spare blocks in the flash memory 140 and the number of non-spare blocks corresponding to different ratios of effective pages to determine whether the garbage-collection process is executed or not. When the number of spare blocks is lower than the predetermined value, the controller 120 calculates whether or not the number of non-spare blocks corresponding to the ratio of effective pages within the first segment is greater than the first threshold value. When the number of non-spare blocks corresponding to the ratio of effective pages within the first segment is greater than the first threshold value, the predetermined value will be decremented by the controller 120 with the first difference value. Therefore, the garbage-collection process of the present invention can be executed or operated according to a dynamically-adjustable predetermined value rather than a fixed predetermined value.

Figure 2:
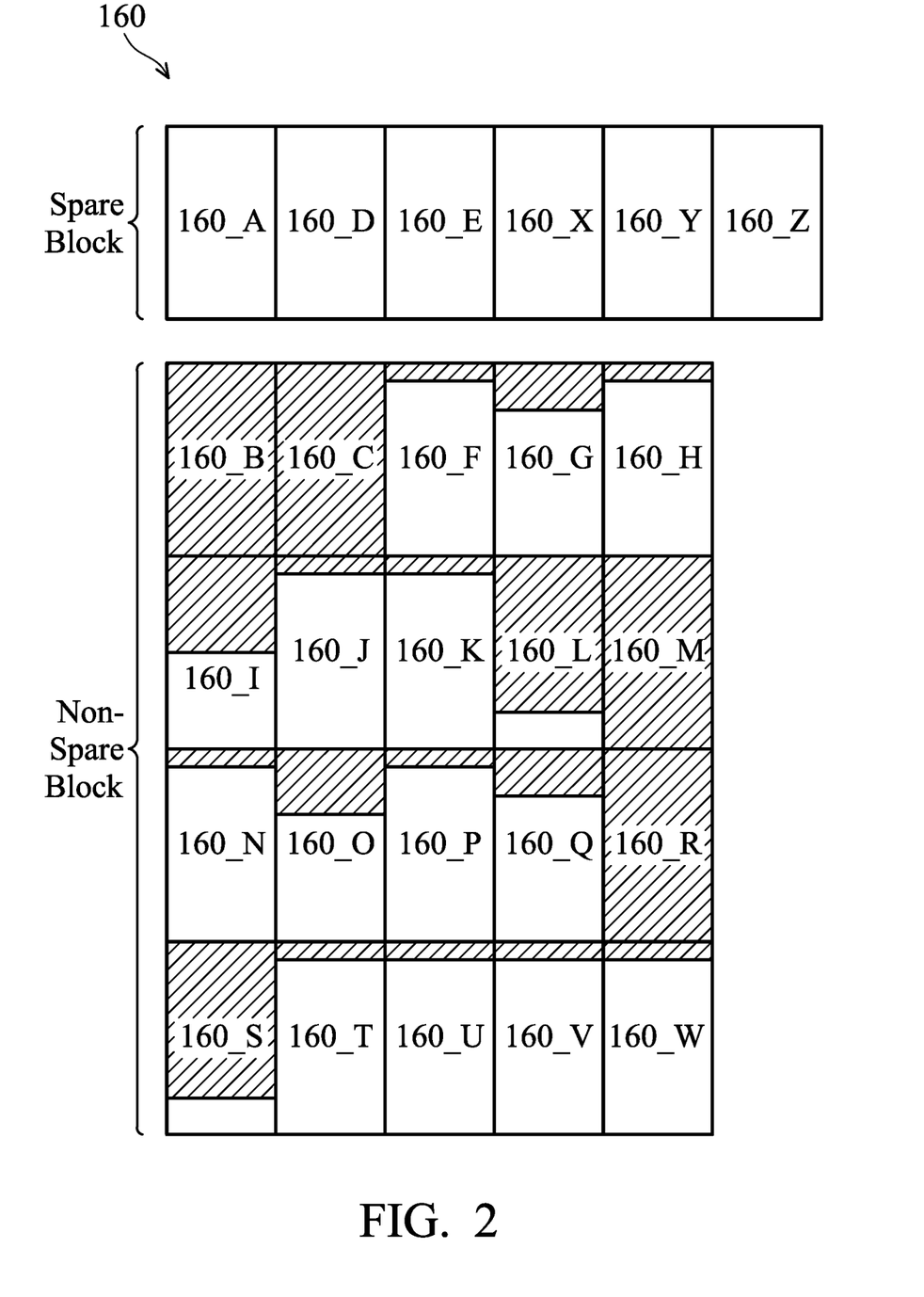
FIG. 2 is a statistical diagram illustrating the calculation of the spare blocks and the non-spare blocks according to an embodiment of the invention.

FIG. 2 is a statistical diagram illustrating the calculation of the leisure blocks and the non-spare blocks in the flash memory 140 according to an embodiment of the invention. The data storage status of the blocks 160_A~160_Z of the storage plane 160 is statistically calculated in the embodiment of FIG. 2, but is not limited thereto. In other embodiments, the data storage status of a portion or all of the blocks of more than two storage planes can statistically calculated.

In the embodiment of FIG. 2, the controller 120 calculates that the storage plane 160 has 6 spare blocks and 20 non-spare blocks. Afterwards, the controller 120 determines whether the number of spare blocks is greater than the predetermined value or not. If the number of spare blocks is greater than the predetermined value, it means that the number of spare blocks is enough and it is not needed to initiate the garbage-collection process to obtain more spare blocks. If the number of spare blocks is lower than or equal to the predetermined value, it means that there are not enough spare blocks and a garbage-collection process is needed to obtain more spare blocks.

In order to execute the garbage-collection process efficiently, the controller 120 of the present invention further calculates the number of non-spare blocks of different portions of effective pages to increment or decrement the predetermined value. As shown below, the effective pages of the non-spare blocks are illustrated as well as how to calculate the number of non-spare blocks corresponding to different ratios of effective pages.

As shown in FIG. 2, the block 160_B is filled with data and other data cannot be written to it. Therefore, the portion between the effective pages with written data of the block 160_B and all pages of the block 160_B is 100%. In addition, the portion of effective pages of the block 160_F is about 10%, the portion of effective pages of the block 160_G is about 30%, the portion of effective pages of the block 160_I is about 50%, and the portion of effective pages of the block 160_L is about 70%. As shown in the following table 1, the number of non-spare blocks in different portions of effective pages is looked up and statistically calculated by the controller 120 using a table, and table is stored in the RAM 180.

TABLE 1

|  | Ratios of effective pages (%) | Number of blocks in the section | Portions of blocks in the section (%) |
|---|---|---|---|
| First Section | 0%~20% | 10 | 50% |
| Second Section | 21%~40% | 2 | 10% |
| Third Section | 41%~60% | 2 | 10% |
| Fourth Section | 61%~80% | 2 | 10% |
| Fifth Section | 81%~100% | 4 | 20% |

Because the ratio of effective pages ranges from 0% to 100%, it can be divided into 5 sections. Specifically, the ratio distribution of effective pages of the first section is 0% to 20%, the ratio distribution of effective pages of the second section is 21% to 40%, and so on. Accordingly, the ratio of effective pages of blocks of the first section is the least. Compared to other sections, the blocks of the first section can be merged in the highest efficiency to obtain the spare block, and it also spends the least amount of time executing the garbage-collection process. In the embodiment, the controller 120 calculates whether or not the number of non-spare blocks of the effective pages in the first section is greater than the first threshold value (with a threshold value of 6, for example)."

As shown in table 1, the number of non-spare blocks in the first section is 10, which is greater than the first threshold value. In other words, there are many non-spare blocks in the first section for of the flash memory 140, and the spare blocks can be obtained quickly by merging. Accordingly, the garbage-collection process can be postponed or paused by the controller 120 to prevent the performance of the data storage device 100 being affected. Therefore, the predetermined value is decremented by the first difference value (for example, the first difference value is 1). When the decremented predetermined value becomes less, it means that the conditions for the controller 120 to execute the garbage-collection process become more severe and garbage collection is not currently needed.

It should be noted that in other embodiments, the controller 120 calculates whether or not the ratio of effective pages between the non-spare blocks in the first section and all non-spare blocks is greater than the first threshold value (for example, the threshold value is 20%). As shown in table 1, the ratio of non-spare blocks in the first section is 50%, which is greater than the first threshold value. Therefore, the predetermined value is decremented by the first difference value (for example, the first difference value is 2%) by the controller 120. The decremented predetermined value will be 18%.

Figure 3:
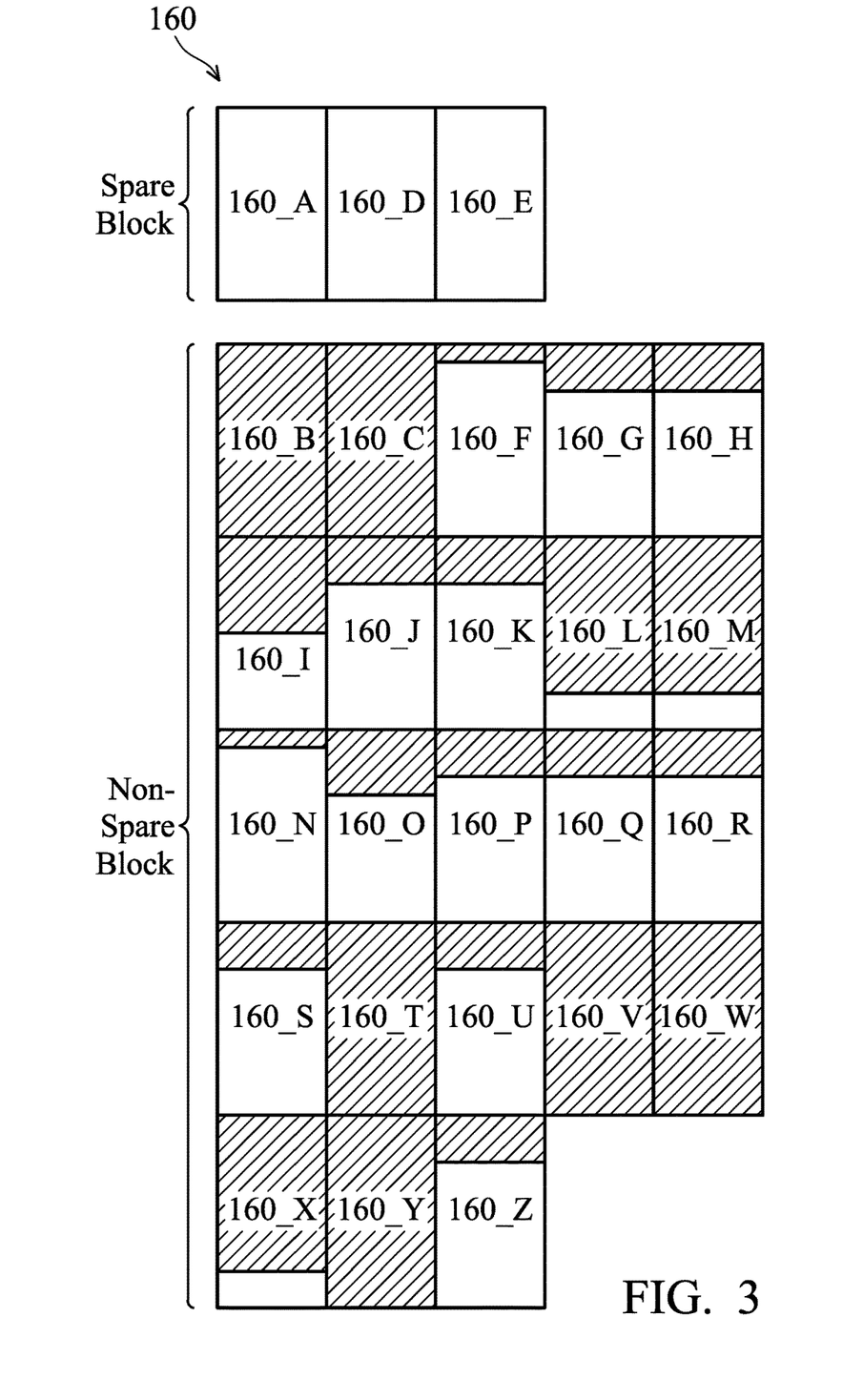
FIG. 3 is a statistical diagram illustrating the calculation of the spare blocks and the non-spare blocks according to another embodiment of the invention.

FIG. 3 is a statistical diagram illustrating the calculation of the leisure blocks and the non-spare blocks in the flash memory 140 according to another embodiment of the invention. In the embodiment, there are 3 spare blocks and 23 non-spare blocks. The amount of non-spare blocks corresponding to different ratios of effective pages is illustrated in table 2.

TABLE 2

|  | Ratios of effective pages (%) | Number of blocks in the section | Portions of blocks in the section (%) |
|---|---|---|---|
| First Section | 0%~20% | 2 | 9% |
| Second Section | 21%~40% | 10 | 42% |
| Third Section | 41%~60% | 2 | 9% |
| Fourth Section | 61%~80% | 3 | 13% |
| Fifth Section | 81%~100% | 6 | 27% |

In the embodiment, the ratio or number of non-spare blocks in the first section for the effective pages is not greater than the first threshold value. Therefore, the predetermined value is not decremented by the first difference value by the controller 120. The controller 120 determines whether or not the ratio or number of non-spare blocks in the second section of the effective pages is not greater than the second threshold value (for example, the second threshold value may be 6% or 27%). It should be noted that the value of the second section (21%~40%) is greater than the value of the first section (0%~20%).

As shown in table 2, the number of non-spare blocks in the second section is 10, which is greater than the second threshold value. In other words, there are many non-spare blocks in the second section for the flash memory 140, and the spare blocks can be obtained quickly by merging. Therefore, the predetermined value is decremented by the second difference value (for example, the second difference value is 1). When the decremented predetermined value decreases, it means that the conditions for the controller 120 to execute the garbage-collection process become more severe and garbage collection is not currently needed.

Figure 4:
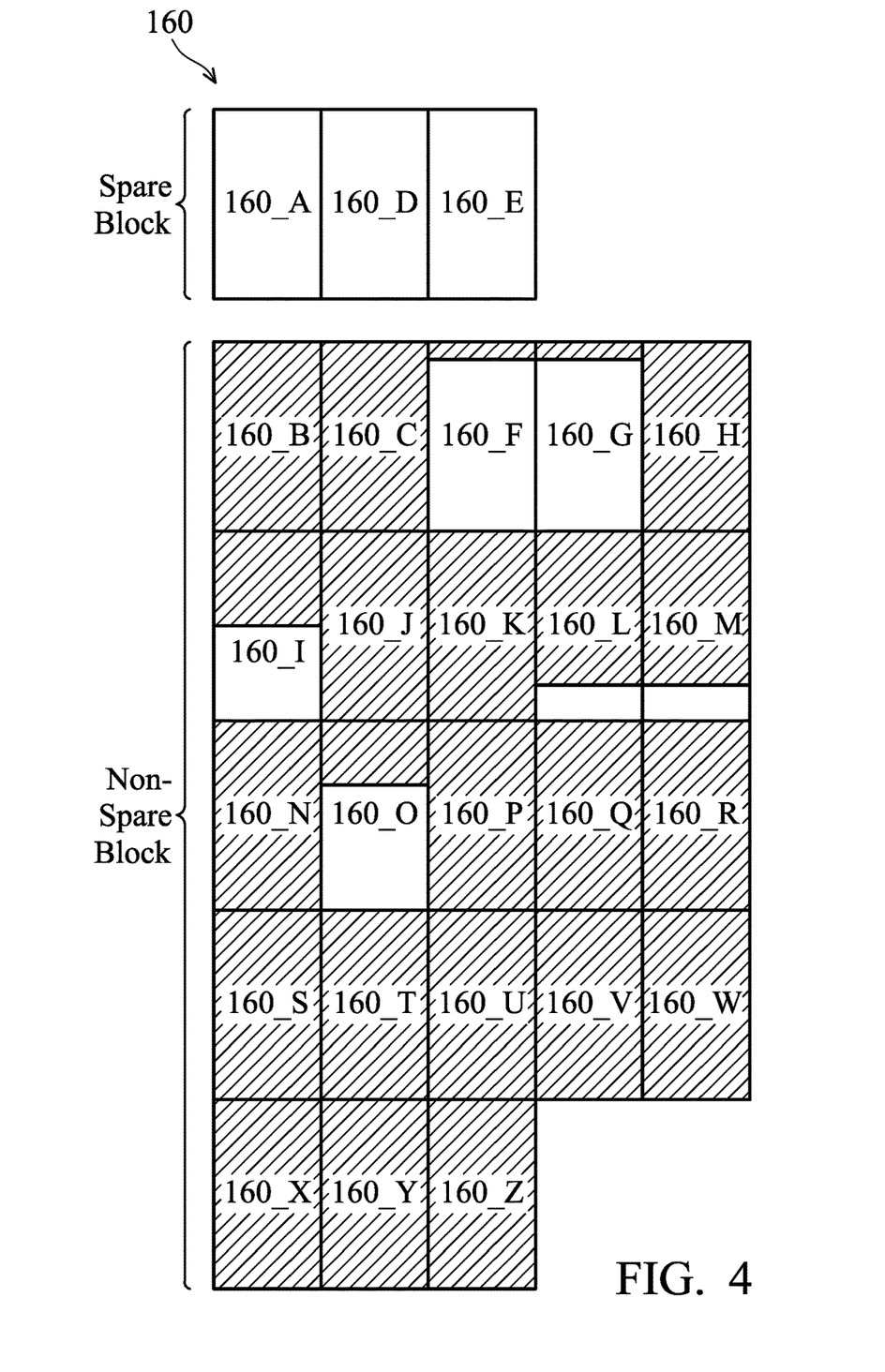
FIG. 4 is a statistical diagram illustrating the calculation of the spare blocks and the non-spare blocks according to another embodiment of the invention.

FIG. 4 is a statistical diagram illustrating the calculation of the leisure blocks and the non-spare blocks in the flash memory 140 according to another embodiment of the invention. In the embodiment, there are 3 spare blocks and 23 non-spare blocks. The amount of non-spare blocks corresponding to different ratios of effective pages is illustrated in table 3.

TABLE 3

| | Ratios of effective pages (%) | Number of blocks in the section | Portions of blocks in the section (%) |
|---|---|---|---|
| First Section | 0%~20% | 2 | 9% |
| Second Section | 21%~40% | 2 | 9% |
| Third Section | 41%~60% | 2 | 9% |
| Fourth Section | 61%~80% | 5 | 21% |
| Fifth Section | 81%~100% | 12 | 52% |

In the embodiment, the ratio or number of non-spare blocks in the first section of the effective pages is not greater than the first threshold value, and the ratio or number of non-spare blocks in the second section of the effective pages is not greater than the second threshold value. In other words, there are few non-spare blocks in the first section and the second section of the flash memory 140, and it takes a lot of time to obtain the spare blocks by merging.

Therefore, in the embodiment, the predetermined value is incremented by the third difference value (for example, the third difference value is 1). When the incremented predetermined value becomes greater, it means that the conditions for the controller 120 to execute the garbage-collection process become looser, and a garbage-collection process is needed as soon as possible to avoid the number of spare blocks reaching 0.

In the above embodiments, whether the garbage-collection process is executed or not is determined by the controller 120 based on the number of non-spare blocks for different ratios of effective pages. In other embodiments, the controller 120 executes the garbage-collection process in the flash memory 140 based on a command transmitted by the host 200 corresponding to the operation of the host 200. In other words, the host 200 can force the controller 120 to execute the garbage-collection process to meet the requirement of accessing data.

Figure 5A:
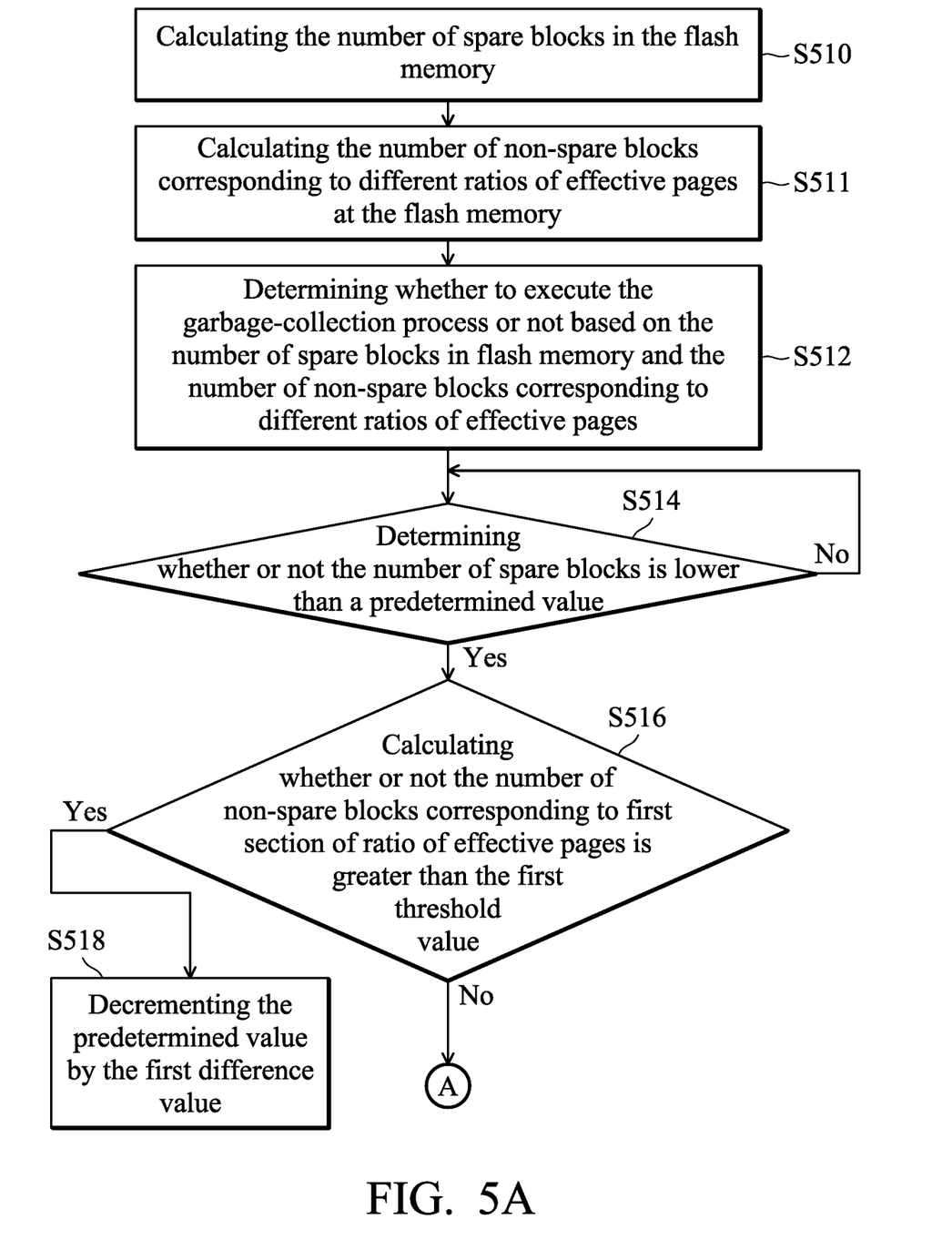
FIGS. 5A&5B are a flowchart illustrating the operating method of the flash memory according to an embodiment of the invention.
Figure 5B:
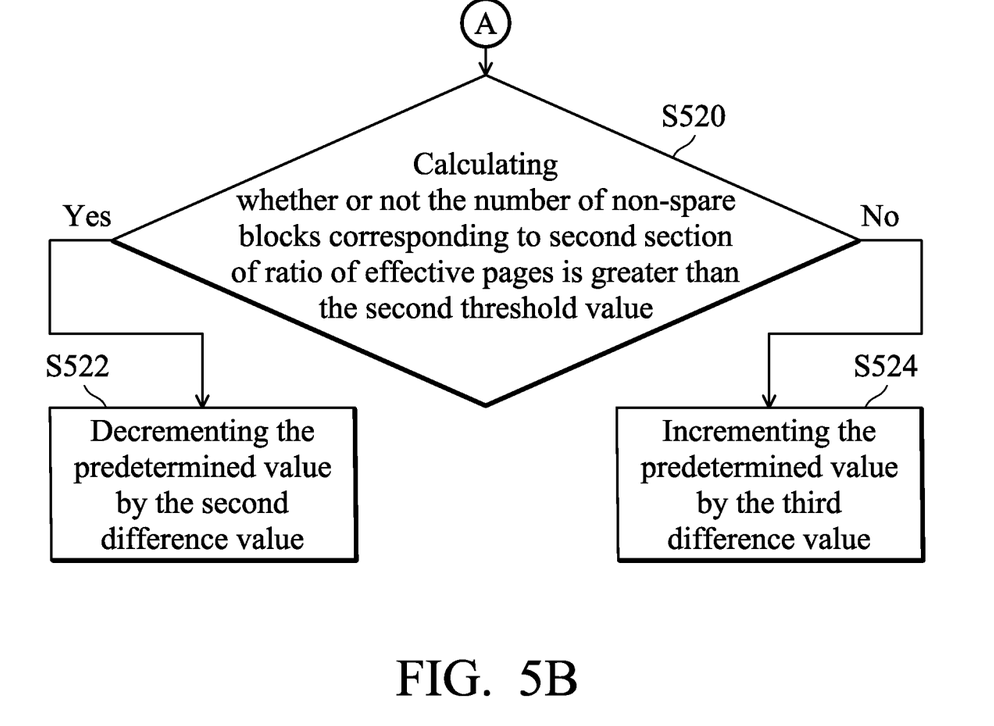

FIGS. 5A&5B are a flowchart illustrating the operating method of the flash memory 140 according to an embodiment of the invention. In step S510, the controller 120 calculates the number of spare blocks in the flash memory 140. In step S511, the controller 120 calculates the number of non-spare blocks corresponding to different ratios of effective pages at the flash memory 140. In step S512, the controller 120 determines whether to execute the garbage-collection process or not based on the number of spare blocks in the flash memory 140 and the number of non-spare blocks corresponding to different ratios of effective pages.

In step S514, the controller 120 determines whether or not the number of spare blocks is lower than a predetermined value. If the number of spare blocks is not lower than the predetermined value, step S514 will be executed again. If the number of spare blocks is lower than the predetermined value, step S516 will be executed so that the controller 120 calculates whether or not the number of non-spare blocks corresponding to the first section of ratio of effective pages is greater than the first threshold value.

If the number of non-spare blocks corresponding to the first section of ratio of effective pages is greater than the first threshold value, step S518 will be executed so that the controller 120 decrements the predetermined value by the first difference value. If the number of non-spare blocks corresponding to the first section of ratio of effective pages is not greater than the first threshold value, step S520 will be executed so that the controller 120 calculates whether or not the number of non-spare blocks corresponding to the second section of ratio of effective pages is greater than the second threshold value. If yes, step S522 will be executed so that the controller 120 decrements the predetermined value by the second difference value. If not, step S524 will be executed so that the controller 120 increments the predetermined value by the third difference value.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name to distinguish the claim elements. While the invention has been described by way of example and in terms of the preferred embodiments, it should be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A data storage device for dynamically executing a garbage-collection process, comprising:
    a flash memory, comprising a plurality of blocks, wherein each of the blocks comprises a first number of pages, and the blocks comprise at least one non-spare block that has at least one effective page, and each non-spare block has a ratio of a second number of effective pages to the first number of pages in each non-spare block; and
    a controller, coupled to the flash memory, configured to execute the garbage-collection process on the flash memory according to a second number of the at least one spare block in the flash memory and a third number of the non-spare blocks in each of different sections that correspond to different ranges of the ratio of the at least one non-spare block, wherein the garbage-collection process is utilized for merging at least two non-spare blocks to obtain at least one spare block.

2. The data storage device for dynamically executing the garbage-collection process claimed in claim 1, wherein:
    the controller calculates the second number of the at least one spare block of the flash memory and determines whether the second number of the at least one spare block is lower than a predetermined value or not.

3. The data storage device for dynamically executing the garbage-collection process claimed in claim 2, wherein:
    when the second number of the at least one spare block is lower than the predetermined value, the controller calculates whether or not the third number of non-spare blocks corresponding to a first section of the different sections is greater than a first threshold value.

4. The data storage device for dynamically executing the garbage-collection process claimed in claim 3, wherein:
    when the third number of non-spare blocks corresponding to the first section is greater than the first threshold value, the controller decrements the predetermined value by a first difference value.

5. The data storage device for dynamically executing the garbage-collection process claimed in claim 3, wherein:
when the third number of non-spare blocks corresponding to the first section is lower than or equal to the first threshold value, the controller calculates whether or not the third number of non-spare blocks corresponding to a second section of the different sections is greater than a second threshold value.

6. The data storage device for dynamically executing the garbage-collection process claimed in claim 5, wherein:
the range of the second section is higher than the range of the first section.

7. The data storage device for dynamically executing the garbage-collection process claimed in claim 5, wherein:
when the third number of non-spare blocks corresponding to the second section is greater than the second threshold value, the controller decrements the predetermined value by a second difference value.

8. The data storage device for dynamically executing the garbage-collection process claimed in claim 5, wherein:
when the third number of non-spare blocks corresponding to the second section is lower than or equal to the second threshold value, the controller increments the predetermined value by a third difference value.

9. The data storage device for dynamically executing the garbage-collection process claimed in claim 2, further comprising:
the controller is coupled to a host, and the controller executes the garbage-collection process based on a command which is transmitted by the host.

10. A data storage method for dynamically executing a garbage-collection process, wherein the data storage device comprises a flash memory and a controller, and the flash memory comprises a plurality of blocks, wherein each of the blocks comprises a first number of pages, and the blocks comprise at least one non-spare block that has at least one effective page, and each non-spare block has a ratio of a second number of effective pages to the first number of pages in each non-spare block, the data storage method comprising:
calculating a second number of the at least one spare block of the flash memory;
calculating a third number of non-spare blocks in each of different sections that correspond to different ranges of the ratio of the at least one non-spare block; and
executing the garbage-collection process on the flash memory according to the second number of the at least one spare block in the flash memory and a third number of the non-spare blocks in each of different sections that correspond to different ranges of the ratio of the at least one non-spare block for merging at least two non-spare blocks to obtain at least one spare block.

11. The data storage method for dynamically executing the garbage-collection process claimed in claim 10, further comprising:
calculating the second number of the at least one spare block of the flash memory; and
determining whether the number of the second at least one spare block is lower than a predetermined value or not.

12. The data storage method for dynamically executing the garbage-collection process claimed in claim 11, wherein:
when the second number of the at least one spare block is lower than the predetermined value, calculating whether or not the third number of the non-spare blocks corresponding to a first section of the different sections is greater than a first threshold value.

13. The data storage method for dynamically executing the garbage-collection process claimed in claim 12, wherein:
when the third number of non-spare blocks corresponding to the first section is greater than the first threshold value, decrementing the predetermined value by the first difference value.

14. The data storage method for dynamically executing the garbage-collection process claimed in claim 12, wherein:
when the third number of non-spare blocks corresponding to the first section is lower than or equal to the first threshold value, calculating whether or not the third number of non-spare blocks corresponding to the second section of the different sections is greater than the second threshold value.

15. The data storage method for dynamically executing the garbage-collection process claimed in claim 14, wherein:
the range of the second section is higher than the range of the first section.

16. The data storage method for dynamically executing the garbage-collection process claimed in claim 14, further comprising:
when the third number of non-spare blocks corresponding to the second section is greater than the second threshold value, decrementing the predetermined value by a second difference value.

17. The data storage method for dynamically executing the garbage-collection process claimed in claim 14, wherein:
when the third number of non-spare blocks corresponding to the second section is lower than or equal to the second threshold value, incrementing the predetermined value by a third difference value.

18. The data storage method for dynamically executing the garbage-collection process claimed in claim 13, further comprising:
coupling the controller to a host; and
executing the garbage-collection process based on a command which is transmitted by the host.

* * * * *